United States Patent [19]
Landi et al.

[11] Patent Number: 6,163,828
[45] Date of Patent: Dec. 19, 2000

[54] METHODS AND APPARATUS FOR PROVIDING MULTI-PROCESSOR ACCESS TO SHARED MEMORY

[75] Inventors: Joseph Landi, Morganville, N.J.; Thomas Ferreras, Staten Island, N.Y.; Mehrdad Fathi, Perth Amboy, N.J.

[73] Assignee: Lucent Technologies Inc., Murray Hill, N.J.

[21] Appl. No.: 09/083,220

[22] Filed: May 22, 1998

[51] Int. Cl.[7] .............................. G06F 13/16; G06F 12/00; G06F 13/36

[52] U.S. Cl. .................. 710/240; 711/100; 711/147; 710/107; 710/113

[58] Field of Search ...................................... 711/163, 151, 711/150, 152, 147; 710/100, 108, 107, 262, 240, 113; 712/203; 709/104; 327/19; 379/88.13, 90.01, 112; 455/6.3, 26.1, 95

[56] References Cited

U.S. PATENT DOCUMENTS

| | | | |
|---|---|---|---|
| 4,354,227 | 10/1982 | Hays, Jr. et al. | 364/200 |
| 4,400,771 | 8/1983 | Suzuki et al. | 364/200 |
| 4,549,273 | 10/1985 | Tin . | |
| 4,737,932 | 4/1988 | Baba . | |
| 5,148,112 | 9/1992 | Gahan . | |
| 5,175,829 | 12/1992 | Stumpf et al. . | |
| 5,467,461 | 11/1995 | Nasu et al. . | |
| 5,567,900 | 10/1996 | Higashi . | |
| 5,907,862 | 5/1999 | Smaley . | |

FOREIGN PATENT DOCUMENTS

0444711A2  4/1991  European Pat. Off. .

OTHER PUBLICATIONS

By Alan Clements, "Microcomputer Design andConstruction" Prentice Hall International, pp. 375–378.

By Thomas L. Harman, The Motorola MC68000 Microprocessor Family: Assembly Language, Interface Design, and System Design. Published Prentice Hall, Englewood Cliffs, NJ, pp. 332–336, 360–364.

By Alan Clements, "Microcomputer Design and Construction" Prentice Hall International, pp. 378–385.

*Primary Examiner*—Gopal C. Ray

[57] ABSTRACT

A multi-processor interface is described having two processors. The first processor lacks a ready input and is continuously operating. The two processors share a memory, where the operation of the second processor is suspended when it requests memory access while the first processor has memory access. The multi-processor interface also includes a bus arbiter which selectively connects the memory to the first or second processor. The bus arbiter suspends operation of the second processor when the second processor requests memory access while the first processor has memory access.

15 Claims, 3 Drawing Sheets

METHODS AND APPARATUS FOR PROVIDING MULTI-PROCESSOR ACCESS TO SHARED MEMORY

BACKGROUND OF THE INVENTION

Field of the Invention

The present invention is directed to a multi-processor interface for connecting at least two processors to a shared memory, and more particularly, to a multi-processor interface that allows normal execution and access to the shared memory by both processors except for one of the processors being placed in a wait state when requesting memory access while the other processor is already accessing the shared memory.

DISCUSSION OF THE PRIOR ART

The present invention relates to two processors sharing a memory. Typically, a dual port memory is used where the first port is dedicated to a first processor, while the second port is dedicated to the second processor. A dual port memory is in effect two memories in one and is relatively expensive.

To reduce cost, a single port memory has been used along with control logic for allowing the two processors to share buses for memory access. In the case of a single port memory being shared with primary and secondary processors, the primary processor typically has access to the memory. The primary processor is typically a central processing unit (CPU), while the secondary processor is a digital signal processing unit (DSP).

FIG. 1 is a timing diagram 10 of signals showing DSP and CPU memory access times $t_1$ and $t_3$, respectively. A CPU hold request signal, shown in FIG. 1 as HLD_REQ, is asserted by the DSP when it requests access to the memory. Shortly after receipt of the hold request signal HLD_REQ, namely its rising edge 12, the CPU stops execution and notifies a bus arbiter. In response, the bus arbiter provides a CPU hold acknowledge signal HLD_ACK to the DSP. In particular, after the bus arbiter receives notification that the CPU executions are halted, then the rising edge 12 of the HLD_REQ signal from the DSP causes the rising edge 14 of the HLD_ACK signal from the bus arbiter. In addition to the signals exchanged between the DSP and the bus arbiter, the bus arbiter provides control signals to control logic for connecting either the DSP or the CPU to the shared memory.

Upon receipt of the rising edge 14 of the hold acknowledge signal HLD_ACK, the DSP begins accessing the memory, i.e., reads or writes data, while the execution of the CPU is halted. The DSP must de-assert the CPU HLD_REQ within a first time period $t_1$, after which the HLD_REQ signal goes low, as shown in FIG. 1 by the falling edge 16 of the CPU HLD_REQ signal. The DSP has access to the memory during this first time period $t_1$ which is typically less than 10 μs after the rising edge 14 of the CPU hold acknowledge signal HLD_ACK. The falling edge 16 of HLD_REQ signal indirectly causes the HLD_ACK signal to go low, where the falling edge of the HLD_ACK signal is shown as reference numeral 18.

Shortly after receipt of the falling edge 18 of the CPU HLD_ACK, the DSP asserts (rising edge 20) and then de-asserts (falling edge 22) a DSP request signal DSP_REQ. The time $t_2$ between the rising and falling edges 20, 22 of the DSP_REQ signal is greater than 1 μs. The DSP_REQ signal serves as an interrupt to the CPU to indicate that the shared memory has new contents.

Once the DSP asserts the DSP_REQ signal, the DSP must wait for a time period $t_3$ from the DSP_REQ rising edge 22 before the DSP can access the memory. During this time period $t_3$, the memory is accessible by the CPU. Typically, the time period $t_3$ is greater than 5 ms.

Despite having a single port memory, system efficiency is substantially degraded since each cycle is divided into a DSP portion $t_1$ where memory is dedicated to the DSP, and a CPU portion $t_3$ where the memory is dedicated to the CPU. For each cycle, the CPU operation is halted during the DSP portion $t_1$, where the memory is dedicated to the DSP, even if the DSP does not require memory access. Thus, the CPU operation is halted during the DSP portion $t_1$ of every cycle where memory access is granted to the DSP. This is highly inefficient since the CPU operation is always halted for the DSP portion $t_1$ of each cycle, even when neither the CPU nor the DSP actually requires memory access.

Instead of halting CPU operation during the DSP portion $t_1$ of each cycle, efficiency is increased by halting the CPU operation during only a cycle portion when the DSP requests memory access. However, this is still inefficient, since CPU executions are halted even when the CPU does not require memory access and only the DSP requires memory access. Accordingly, there is a need for a device that allows a single port memory to be shared by at least two processors in a highly efficient manner.

SUMMARY OF THE INVENTION

The object of the present invention is to provide a multi-processor interface that eliminates the problems of conventional multi-processor interfaces.

Another object of the present invention is to provide a multi-processor interface that allows two processors to share a single-port memory and operate continuously so long as there are no collisions.

A further object of the present invention is to provide a multi-processor interface that allows efficient sharing of a single-port memory by at least two processors.

A still further object of the present invention is to provide a multi-processor interface which allows a general purpose processor, such as a central processing unit CPU, to share a memory with a processor that does not have a hold or ready input, such as a digital signal processor (DSP).

The present invention accomplishes the above and other objects by providing a multi-processor interface which has two processors. The first processor lacks a ready input, for example, and is continuously operating. The two processors share a memory, where the operation of the second processor is suspended, for example, when it requests memory access while the first processor has memory access. The multi-processor interface also includes a bus arbiter which selectively connects the memory to the first or second processor. The bus arbiter suspends operation of the second processor when the second processor requests memory access while the first processor has memory access.

BRIEF DESCRIPTION OF THE DRAWINGS

Further features and advantages of the invention will become more readily apparent from a consideration of the following detailed description set forth with reference to the accompanying drawings, which specify and show preferred embodiments of the invention, wherein like elements are designated by identical references throughout the drawings; and in which.

DETAILED DESCRIPTION OF THE INVENTION

Figure 2:
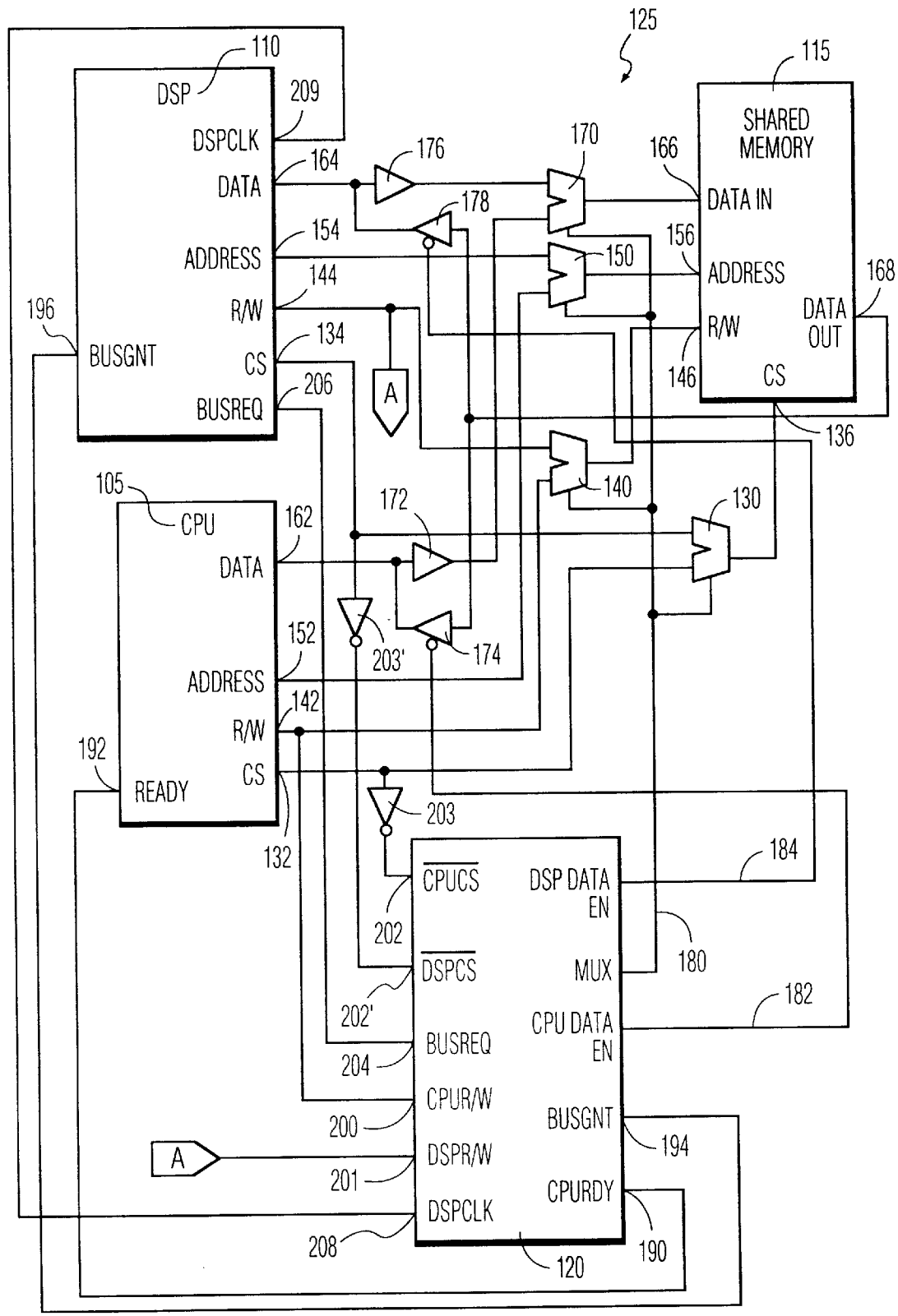
FIG. 2 shows a multi-processor interface for sharing a single-port memory between a CPU and a DSP according to the present invention.

FIG. 2 shows a multi-processor interface 100 for connecting multiple processors, one at a time, to a memory shared by all the processors. All the processors need not have a wait, hold or ready input. Thus, unlike general micro-controllers or processors such as central processing units (CPUs), at least one of the processors may be of the type that does not have a wait or hold input, e.g., a digital signal processor (DSP). Illustratively, FIG. 2 shows the multi-processor interface 100 which connects a CPU 105 and a DSP 110 to a shared single-port memory 115, such as a static random access memory (SRAM).

The multi-processor interface 100 includes a bus arbiter 120 and arbitration logic 125. The arbitration logic 125 selectively connects either the CPU 105 or the DSP 110 to the SRAM 115. As will be described, this selective connection to the memory 115 is achieved by multiplexers and buffers controlled by the bus arbiter 120. Four multiplexers selectively connect the CPU 105 or the DSP 110 to the memory 115. Further, four buffers allow for two way data transfer between the two processors 105, 110 and the memory 115.

In particular, a chip select (CS) multiplexer 130 selectively connects the CPUCS port 132 or the DSPCS port 134 to the memory CS port 136. The read/write (R/W) ports 142, 144 of the CPU and DSP are selectively connected one at a time to the memory R/W port 146 through a R/W multiplexer 140. Similarly, the address ports 152, 154 of the CPU and DSP are selectively connected one at a time to the memory address port 156 through an address multiplexer 150.

The CPU and DSP data ports 162, 164 are selectively connected one at a time to the memory data-in port 166 and data-out port 168 through a data multiplexer 170 and four buffers 172, 174, 176, 178. Buffers 172, 176 allow data flow from the CPU and DSP ports 162, 164 to the two inputs of the data multiplexer 170, which selectively connects one of the two processor data ports 162, 164 to the memory data-in port 166. Similarly, buffers 174, 178 selectively connect one at a time the CPU or DSP data ports 162, 164 to the memory data-out port 168.

The multiplexers 130, 140, 150, 170 are selected using a MUX control signal 180 from the bus arbiter 120 for connecting either the CPU 105 or the DSP 110 to the memory 115. In particular, a first state of the MUX control signal 180, such as logic 0, connects the CPU 105 to the memory 115 while a second state, such as logic 1, connects the DSP 110 to the memory 115. A CPU data enable control signal 182 and a DSP data enable control signal 184 cooperate to enable one of the buffers 174, 178 at any one time. This connects the memory data-out port 168 to the CPU or DSP data ports 162, 164.

The bus arbiter 120 has a CPU ready output port 190 which is connected to the CPU ready input port 192. A bus grant output port 194 of the bus arbiter 120 is connected to a bus grant input port 196 of the DSP 110 which receives a BUS-GRANT signal as will be described. The bus arbiter 120 also has CPU R/W and DSP R/W input ports 200, 201 which are connected to the CPU R/W and DSP R/W output ports 142, 144, respectively.

A CPUCS complement input port 202 of the bus arbiter 120 is connected to the CPUCS output port 132 of the CPU 105 through an inverter 203. Similarly, a DSPCS complement input port 202' of the bus arbiter 120 is connected to the DSPCS output ports 134 of the DSP 110 through an inverter 203'. The two inverters 203, 203', at the CPU and DSP chip select (CS) outputs are not needed in the case where CS complement signals are provided from the CPU 105 and DSP 110.

Further, a bus request (BUSREQ) input port 204 of the bus arbiter 120 is connected to a BUSREQ output port 206 of the DSP 110. A DSP clock signal is also provided to the bus arbiter 120 at a DSPCLK input port 208 which is connected to the DSPCLK output port 209 of the DSP 110.

The majority of the time, only one of the processors is accessing the shared memory. During such instances, the memory appears to each processor as if it were a dedicated memory on a dedicated bus. Thus, accessing the memory for read and write operations is achieved through standard memory instructions without major modifications. Only a few control instructions are required for the memory requesting processor to assert a memory request and get a bus connection, hence memory access. These control instructions enable the appropriate multiplexers 130, 140, 150, 170 and buffers 174, 178 of the arbitration logic 125 to provide the desired bus connection.

In the instances where a collision exists, where one processor needs to access the memory while the other processor is already accessing the memory, the multi-processor interface 100 allows for orderly and efficient memory access despite the DSP, which does not have a ready or halt/wait input and is continuously operating. Further, the CPU operation is only halted for a minimal duration. In particular, when the DSP 110 is already accessing the memory 115 and the CPU 105 requires memory access, then the CPU 105 is placed in a wait or hold state. This will be described in greater detail in connection with FIG. 4.

In the case where the CPU 105 is accessing the memory 115 and the DSP 110 requires memory access, then the DSP 110 continues operating to process data that does not require memory access, such as processing audio and/or video signals, until the CPU 105 is finished accessing the memory, in which case, the DSP 110 accesses the memory 115. This situation will be described in greater detail in connection with FIG. 3.

Thus, despite not having a ready, wait or hold input, the multi-processor interface 100 allows the DSP 110, or any other processor lacking a ready input, to share the single port memory without being placed in a hold or wait state. This processor or DSP continues to operate instead of stopping operation or waiting for memory access.

Figure 1:
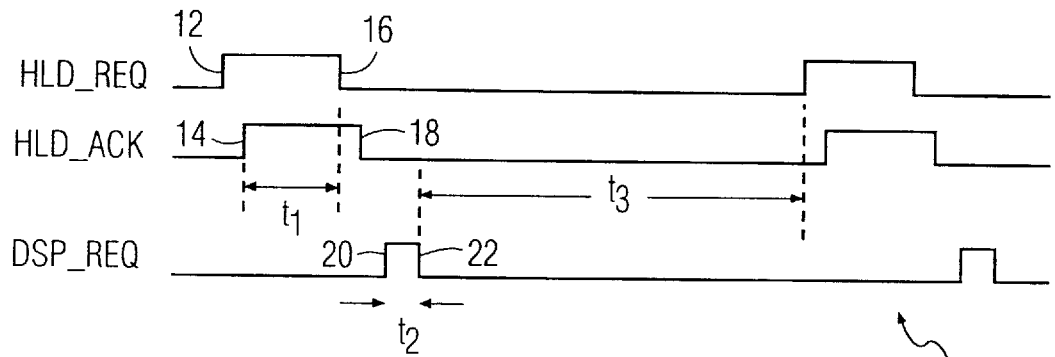
FIG. 1 shows a conventional timing diagram of signals for sharing a memory by two processors.
Figure 3:
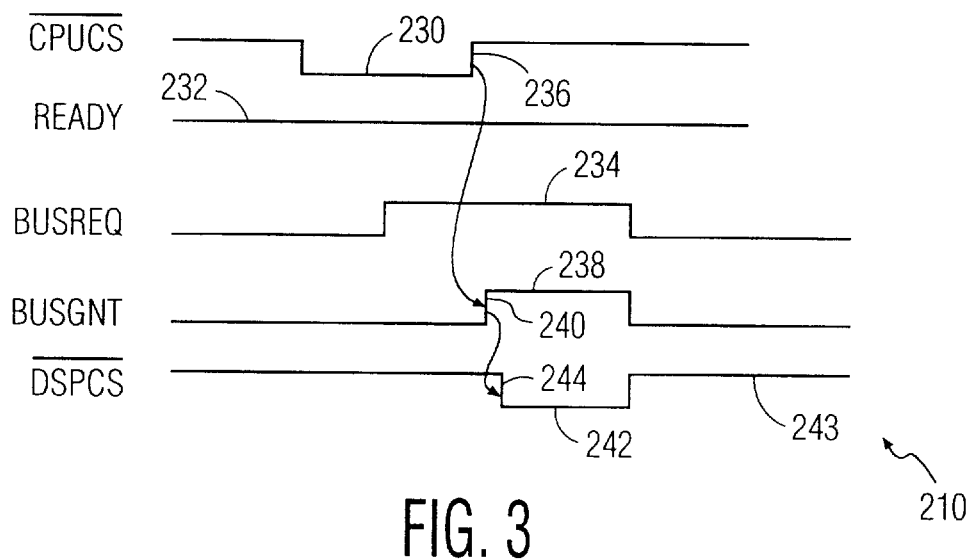
FIG. 3 shows a timing diagram of signals used for DSP memory access when the CPU currently has memory access according to present invention.
Figure 4:
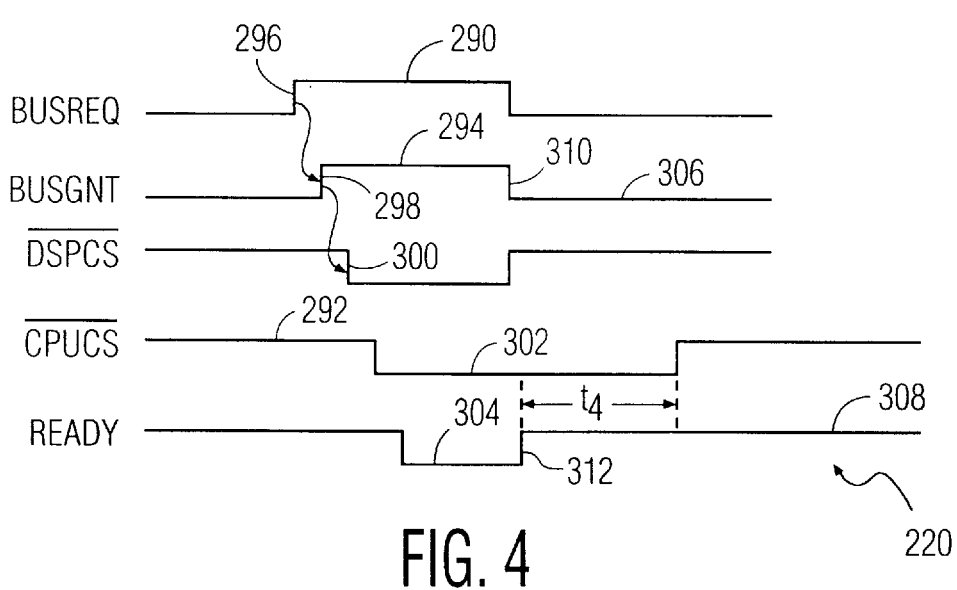
FIG. 4 shows a timing diagram of signals used for CPU memory access when the DSP currently has memory access according to present invention.

The collision scenarios are explained in further detail with reference to FIGS. 3 and 4, where FIG. 3 shows a timing diagram 210 of signals used for DSP memory access when the CPU 105 currently has memory access, and FIG. 4 shows a timing diagram 220 of signals used for CPU memory access when the DSP 110 currently has memory access. The timing diagrams shown in FIGS. 3 and 4 are achieved using the bus arbiter 120 as will be explained.

Referring to FIGS. 2 and 3, the CPU 105 outputs a high CPUCS signal when the CPU desires memory access, which in inverted by an inverter 203 to provide the bus arbiter 120 with a low 230 CPUCS complement signal. The CPU operates and thus accesses the memory in response to the low 230 CPUCS complement signal so long as the CPU READY signal from the bus arbiter's CPURDY output port 190 is high. Note, in this collision scenario, the READY signal is always high, as shown in FIG. 3 by reference numeral 232, indicating the CPU operation is never stopped, even when memory access is granted to the DSP 110, thus preventing efficiency reduction. This is because the DSP 110 is granted memory access when the CPU has finished accessing the memory, and there is no need to stop the CPU operation.

In particular, a BUSREQ signal from the DSP bus request port 134 to the bus arbiter bus request port 204 goes high 234 when the DSP desires memory access. FIG. 3 shows the case where the DSP memory request or bus request occurs (BUSREQ goes high) during the CPU memory access time, i.e., when CPUCS complement is low 230 and READY is high 232.

To prevent the DSP 110 from accessing the memory 115 when the CPU 105 has memory access, the low CPUCS complement 230 prevents the bus arbiter 120 from granting a bus to the DSP 110 for connection to the memory 115. The bus arbiter 120 grants a bus request to the DSP 110 when the CPU 105 finishes memory access. In particular, the rising edge 236 of the CPUCS complement signal, which occurs when the CPU is finished accessing the memory, causes a BUSGNT signal to go high 238.

The BUSGNT signal is provided from the bus arbiter's bus grant port 194 to the DSP's bus grant port 196. When the BUSGNT signal goes high 238, i.e., the rising edge 240 thereof, a DSPCS complement signal goes low 242 (falling edge 244) which indicates that the DSP 110 has access the memory 115. Thus, the DSP memory access is granted after the CPU finishes its memory access. However, DSP operations are not halted, and the DSP continues its operations despite not being granted access to the memory. When the DSP memory access is over, the DSPCS complement signal goes high 243 (FIG. 3) and disables the DSP data buffer 178 (FIG. 2), as will be explained in connection with FIG. 5.

Figure 5:
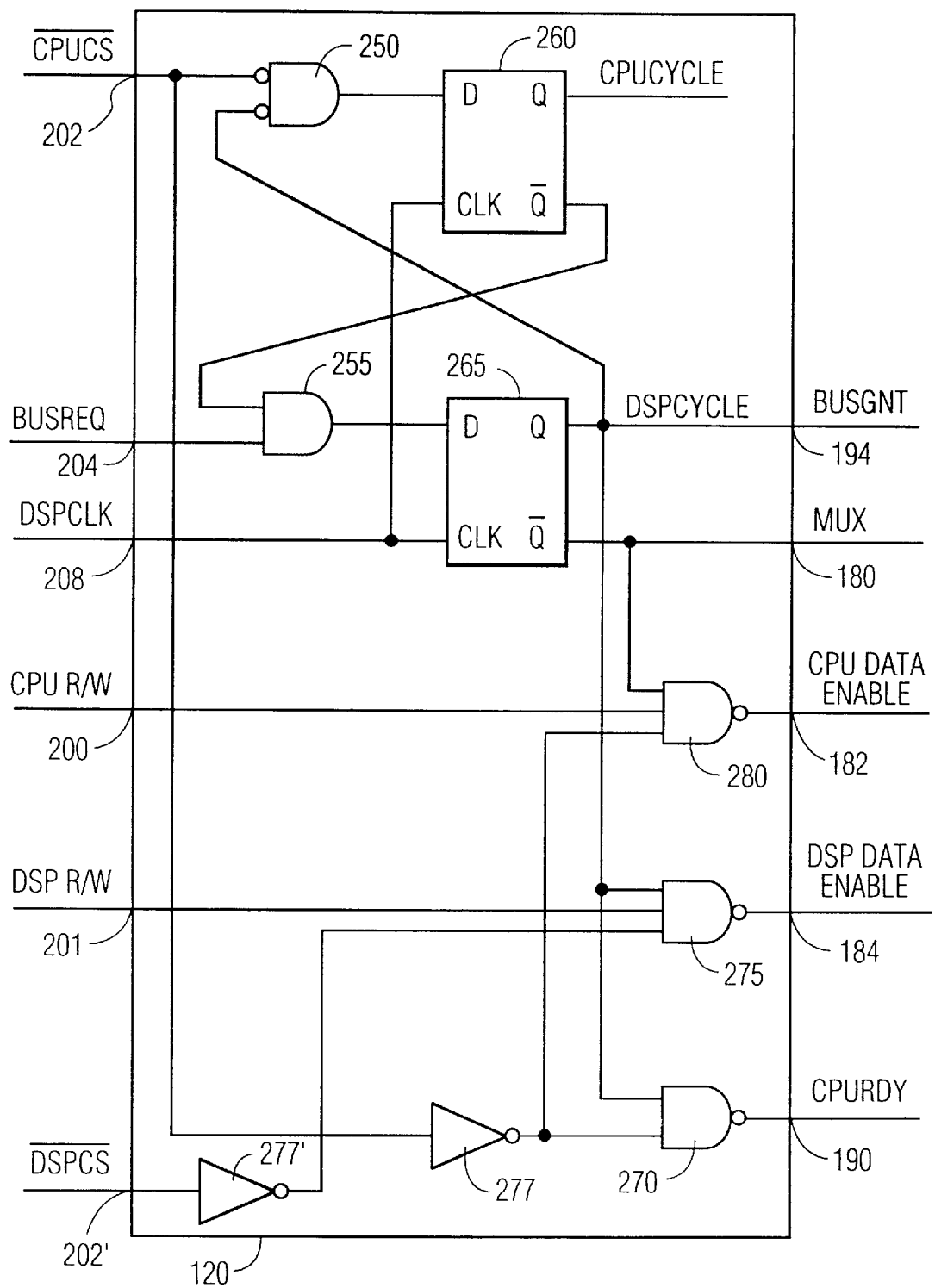
FIG. 5 is a detailed diagram of a bus arbiter shown in FIG. 2 according to present invention.

The timing relationship shown in FIG. 3 results in part from the bus arbiter 120, which is shown in greater detail in FIG. 5. As shown in FIG. 5, the bus arbiter 120 has a NOR gate 250 which receives the CPU chip select complement signal (CPUCS complement) as one input. An AND gate 255 receives the DSP bus request signal BUSREQ at one input. Two registers, such as D flip-flops 260, 265, have their signal inputs connected to the output of the NOR and gates 250, 255, respectively. The flip-flops 260, 265 are clocked by the DSPCLK signal received at the input port 201 of the bus arbiter 120.

The true output of the first or CPU flip-flop 260 provides a signal indicative of the CPU cycle, shown as CPUCYCLE, where the CPU has the bus and thus has access to the memory 115 (FIG. 2). The complement output of the CPU flip-flops 260 is connected to the second input of the AND gate 255.

The true output of the second or DSP flip-flop 265 is the bus grant signal (BUSGNT), also referred to as the DSPCYCLE, since the DSP has the bus and thus has access to the memory 115 (FIG. 2). The complement output of the DSP flip-flops 265 is the MUX signal 180, also shown in FIG. 2. The BUSGNT signal line is connected to the second input of the NOR gate 250 as well as the first inputs of two NAND gates 270, 275. One of these two NAND gates 270 has its other input connected to the CPUCS complement port 202 through an inverter 277, to receive the CPUCS true signal. The output of this NAND gate 270 is the CPU ready signal CPURDY provided from output port 190 of the arbiter 120.

The other NAND gate 275, which receives the BUSGNT signal at one input, has another input connected to the arbiter's DSP read/write (R/W) port 201. A third input of the NAND gate 275 is connected to the DSPCS complement port 202' through an inverter 277' to receive the DSPCS true signal. The output of this NAND gate 275 is the DSP DATA ENABLE signal 184, also shown in FIG. 2. A high DSPCS complement signal, shown in FIGS. 3 and 4, disables the DSP data buffer 178 (FIG. 2). This is readily ascertained from the NAND gate 275 of FIG. 5, which produces an enabling signal low only when all its inputs are high. Thus, a high DSPCS complement signal or a low DSPCS true signal will cause the output of the NAND gate 275 (i.e., the DSP DATA ENABLE signal 184) to go high. The high DSP DATA ENABLE signal 184 disables the DSP data buffer 178 after being inverted, as shown in FIG. 2 by the bubble at the DSP buffer 178.

The bus arbiter 120 also has a third NAND gate 280 with three inputs. The first input of this third NAND gate 280 is connected to the MUX output port 180 and the second input is connected to the CPU R/W port 200 of the arbiter 120. The third input of the third NAND gate 280 receives the CPUCS true signal from the inverter 277. The output of the third NAND gate 280 is the CPU DATA ENABLE signal 182. Similar to the description in the previous paragraph concerning the high DSPCS complement signal, a high CPUCS complement signal disables the CPU data buffer 174 (FIG. 2).

Referring to FIGS. 3 and 5, when the CPUCS complement is low, indicating the CPU desires memory access, and the DSP BUSREQ is low, then both inputs of the NOR gate 250 are low. This results in a high output and a high CPUCYCLE at the true output of the CPU flip-flop 325. The high CPUCYCLE indicates that the CPU can access the memory. The CPURDY output 190 of the NAND gate 270 is high, since at least one of its inputs is low, namely, BUSGNT is low. The high CPURDY allows CPU operation and thus CPU memory access when the CPUCS complement is low.

As shown in FIG. 3, when the DSP BUSREQ goes high 234 during CPU memory access, i.e., when CPUCS complement is low, BUSGNT remains low since the low CPUCS complement disables the AND gate 255. More particularly, when CPUCYCLE is high, its complement from the CPU flip-flop 260 is low, thus disabling the AND gate 255 and keeping BUSGNT low. When CPUCS complement goes high, as shown by the rising edge 236 in FIG. 3, then the output of the NOR gate 250 goes low. This provides a low CPUCYCLE and a high CPUCYCLE complement from the CPU flip-flop 260. The high CPUCYCLE complement enables the AND gate 320 and passes the high BUSREQ to the DSP flip-flop 265, resulting in a high BUSGNT and a low MUX. The high BUSGNT is also referred to as the DSPCYCLE, where the DSP can access the memory.

It is noteworthy that the CPURDY signal remains high, indicating the CPU continues to operate and is not halted, since both inputs (i.e., CPUCS and BUSGNT) of the NAND gate 270 are not high simultaneously, as can be seen from FIG. 3 keeping in mind that the CPUCS complement signal is shown in FIG. 3 while the CPUCS true signal is the input to the NAND gate 270 (FIG. 5).

Further during the CPUCYCLE, where CPUCYCLE is high along with the MUX signal and where BUSGNT is low, the high MUX signal enables the CPU DATA ENABLE NAND gate 280, providing a low output when the CPU R/W signal is high. As shown in FIG. 2, this low CPU DATA ENABLE signal enables CPU buffer 174 after being inverted, as shown by the bubble at the CPU buffer 174. This provides a connection between the memory and the CPU. Meanwhile, the low BUSGNT causes a high output from the DSP DATA ENABLE NAND gate 184, thus producing a low signal to the DSP buffer 178 due to the bubble or inversion shown near the DSP buffer 178 in FIG. 2. This disables the DSP buffer 178 and prevents connection between the memory and the DSP.

FIG. 4 shows a timing diagram 220 for the case where the CPU 105 requests memory access while the DSP 110 is accessing the shared memory 115. As shown in FIG. 4, the DSP outputs to the bus arbiter a high 290 BUSREQ signal when the DSP desires memory access. If no collision exists, i.e., when the CPUCS complement is high 292 indicating the memory 115 (FIG. 2) is free and not being accessed by the CPU, then the bus arbiter 120 outputs a high 294 BUSGNT signal to the DSP in response to a BUSREQ, indicating the DSP has access to the memory.

Thus, when the CPUCS complement is high 292, then the rising edge 296 of the BUSREQ signal causes the rising edge 298 of the BUSGNT, which in turn causes the falling edge 300 of the DSPCS. The low DSPCS signal indicates that the memory is being accessed by the DSP. During the time where the DSP is accessing the memory, i.e., when BUSGNT is high 294, if the CPU desires memory access, then the CPUCS complement goes low 302. To prevent memory access by the CPU, CPU operation is halted by the READY signal going low 304. When the DSP finishes memory access, i.e., when BUSGNT goes low, then the READY signal goes high 308 and the CPU resumes its operation and begins memory access. In particular, the falling edge 310 of BUSGNT causes the rising edge 312 of the READY signal shown in FIG. 4, also referred to as CPURDY in FIG. 5. The level changes of the CPURDY signal is readily seen in FIG. 5. In particular, CPURDY signal is low only when the two NAND gate 270 inputs, i.e., CPUCS and BUSGNT, are both high.

Referring to FIGS. 4 and 5, and similar to that described in connection with FIG. 3, the low BUSREQ signal causes a low AND gate 255 output, thus a low BUSGNT signal. The high 292 CPUCS complement signal causes a low output from the NOR gate 250, thus a low CPUCYCLE signal and a high input to the AND gate 255 which becomes enabled. When the BUSREQ signal goes high 290, the enabled AND gate 255 passes the high BUSREQ and causes BUSGNT signal to go high 294. This high 294 BUSGNT signal disables the NOR gate 250 and prevents its output to go high when the CPUCS complement goes low 302, thus preventing the CPUCYCLE signal from going high. In addition, the high 294 BUSGNT signal enables the NAND gate 270 thus allowing the high CPUCS to pass and provide the low 304 CPURDY signal. The low READY or CPURDY signal halts CPU execution, or places the CPU in a wait state, thus preventing the CPU from accessing the memory.

When the DSP finishes memory access and the BUSREQ signal goes low, thus causing the BUSGNT to go low 306, then the CPURDY signal from the NAND gate 270 goes high 308. The high CPURDY 308 allows the CPU to resume operation and access the memory during time $t_4$. The CPU memory access occurs during time $t_4$ since CPUCS complement is low 302 and BUSGNT is low 306, thus providing a high output from the NOR gate and a high CPUCYCLE, in addition to the high 308 CPURDY signal from the NAND gate 270.

Further, during the DSPCYCLE, i.e., when the BUSGNT is high 294 and the MUX signal is low, the low MUX signal disables the CPU DATA ENABLE NAND gate 280, providing a high output irrelevant of the level of the CPU R/W signal. The high CPU DATA ENABLE 182 disable the CPU buffer 174 and prevents connection between the memory and the CPU. This is due to the bubble or inversion shown near the DSP buffer 174 in FIG. 2.

The high 294 BUSGNT enables the DSP DATA ENABLE NAND gate 275, passing the DSP R/W signal. When the DSP R/W signal is high along with the high 294 BUSGNT, the DSP DATA ENABLE signal 184 is low. As shown in FIG. 2, the low DSP DATA ENABLE signal 184 enables DSP buffer 178 after being inverted, as shown by the bubble at the DSP buffer 178. This provides a connection between the memory and the DSP.

The multi-processor interface is relatively simple in structure and does not require special algorithms or initialization software. The multi-processor interface is random access, which affords the flexibility to format data using software FIFO, or any appropriate sequence.

The multi-processor interface is used in any device that requires more than one processor, such as telephones or displays, where a DSP is used for fast audio and/or video signal processing to provide acceptable audio and/or video signals, and a CPU which provides other control operations, such as call processing and user interface for wireless phones.

The multi-processor interface alleviates the need for a dual-ported memory, and allows a single-ported memory to be shared between two processors, where one of the processors does not have a wait or a hold signal such as a DSP, for example. Instead of dedicating a portion of a processing cycle to the microprocessor where the DSP is prevented from accessing the memory, and another portion to the DSP where microprocessor processing is halted, microprocessor executions are only halted when a collision occurs. Such collisions occur when one processor requests memory access while the other processor is already accessing the memory.

The DSP outputs the bus request signal BUSREQ when it requires access to the memory, and periodically checks for receipt of a bus acknowledge or grant signal BUSGNT. Meanwhile, the DSP continues its operation and accesses the memory upon receipt of the BUSGNT signal, which is provided by the bus arbiter when the memory is not being accessed by the CPU. Thus, the DSP operation is never halted. The CPU operation is halted or placed in a wait mode only when the CPU requires memory access while the DSP is accessing the memory. The CPU resumes operation and accesses the memory once the DSP finishes memory access.

Thus, if the CPU does not request memory access, then CPU operation is not halted when the DSP accesses memory. If there are no collisions, then the two processors operate continuously and access the shared memory whenever needed, through the bus arbiter, multiplexers and buffers, which allow the memory to be accessed by only one processor at a time.

While the invention has been particularly shown and described with respect to illustrative and preferred embodiments thereof, it will be understood by those skilled in the art that the foregoing and other changes in form and details may be made therein without departing from the spirit and scope of the invention which should be limited only by the scope of the appended claims.

What is claimed is:

1. A multi-processor interface comprising:

a first processor which operates continuously and requests memory access by asserting a first request signal;

a second processor which requests memory access by asserting a second request signal;

a memory shared between said first and second processors, wherein operation of said second processor is suspended when said second processor requests memory access by asserting the second request signal while said first processor has memory access; and wherein the first processor processes data that does not require memory access when said first processor requests memory access by asserting the first request signal while said second processor has memory access.

2. The multi-processor interface of claim 1, wherein said first processor lacks a ready input.

3. The multi-processor interface of claim 1, further comprising a bus arbiter which selectively connects said memory to one of said first and second processors.

4. The multi-processor interface of claim 1, further comprising a bus arbiter which suspends said operation of said second processor when said second processor requests memory access while said first processor has memory access.

5. The multi-processor interface of claim 1, further comprising a bus arbiter which prevents memory access by said first processor when said first processor requests memory access while said second processor has memory access.

6. A telephone comprising:

a first processor which operates continuously, performs audio or video signal processing and requests memory access by asserting a first request signal;

a second processor which performs control operations including call processing and requests memory access by asserting a second request signal;

a memory shared between said first and second processors; and a multi-processor interface which suspends operation of said second processor when said second processor requests memory access by asserting said second request signal while said first processor has memory access and which allows the first processor to process data that does not require memory access when said first processor requests memory access by asserting said first request signal while said second processor has memory access.

7. The telephone of claim 6, wherein said first processor lacks a ready input.

8. The telephone of claim 6, wherein said multi-processor interface comprises a bus arbiter which selectively connects said memory to one of said first and second processors.

9. The telephone of claim 6, wherein said multi-processor interface comprises a bus arbiter which suspends said operation of said second processor when said second processor requests memory access while said first processor has memory access.

10. The telephone of claim 6, further comprising a bus arbiter which prevents memory access by said first processor when said first processor requests memory access while said second processor has memory access.

11. A wireless telephone comprising:

a first processor lacking a wait input which performs audio or video signal processing and requests memory access by asserting a first request signal;

a second processor having a ready input which performs control operations including call processing and requests memory access by asserting a second request signal;

a memory shared between said first and second processors; and a multi-processor interface which provides a disabling signal to said ready input when said second processor requests memory access by asserting said second request signal while said first processor has memory access and which allows the first processor to process data that does not require memory access when said first processor requests memory access by asserting said first request signal while said second processor has memory access.

12. The wireless telephone of claim 11, wherein said multi-processor interface comprises a bus arbiter which selectively connects said memory to one of said first and second processors.

13. The wireless telephone of claim 11, wherein said multi-processor interface comprises a bus arbiter which provides said disabling signal in response to a bus grant signal from said bus arbiter to said first processor.

14. The wireless telephone of claim 13, wherein said bus grant signal allows said second processor to access said memory.

15. The wireless telephone of claim 13, wherein said bus grant signal is provided in response to said first request signal from said first processor and when said second processor is not requesting access to said memory.

* * * * *